United States Patent [19]

Campbell

[11] 4,332,538

[45] Jun. 1, 1982

[54] DOUGH DIVIDER

[76] Inventor: Sterret P. Campbell, 3095 Kingston Ct., Norcross, Ga. 30071

[21] Appl. No.: 194,066

[22] Filed: Oct. 6, 1980

[51] Int. Cl.³ .................. A21C 3/04; A21C 11/10; B29C 17/10
[52] U.S. Cl. .................. 425/140; 73/169; 83/556; 83/584; 264/40.2; 264/148; 425/142; 425/174.4; 425/311; 425/376 R
[58] Field of Search ............... 425/142, 145, 101, 141, 425/148, 296, 310, 311, 324.1, 325, 308, 230, 297, 174.4, 405 R, DIG. 60, 140; 73/169, 259, 198; 83/556, 564, 584, 582; 366/85; 99/348

[56] References Cited

U.S. PATENT DOCUMENTS

| | | | |
|---|---|---|---|
| 1,221,594 | 4/1917 | Richman | 83/556 |
| 1,588,018 | 6/1926 | Fitz | 425/140 |
| 1,691,187 | 11/1928 | Haley | 73/259 |
| 1,944,464 | 1/1934 | Richardson | 425/142 |
| 2,099,119 | 11/1937 | King et al. | 425/164 |
| 2,231,357 | 2/1941 | Burghauser et al. | 366/85 |
| 2,642,643 | 6/1953 | Montague | 425/142 |
| 2,649,618 | 8/1953 | Rhodes et al. | 425/142 |
| 2,666,398 | 1/1954 | Gendler et al. | 425/297 |
| 2,733,604 | 2/1956 | Coulter | 73/861.12 |
| 3,203,370 | 8/1965 | Haug et al. | 366/85 |
| 3,442,168 | 5/1969 | Gatto | 83/564 |

FOREIGN PATENT DOCUMENTS 207170  12/1967  U.S.S.R. .................. 366/85

OTHER PUBLICATIONS

Anon., "Magnetic Flowmeters", Fischer & Porter, Cat. C10D, (1967), Warminster, Pa. pp. 8-11 & 14, 15 & 18-21.

Primary Examiner—Willard E. Hoag
Attorney, Agent, or Firm—George M. Thomas

[57] ABSTRACT

Dough which is to be formed into small volumes for later baking into bread, etc. is moved from a mass of dough in the lower portion of a hopper by a pair of helical screws, through a conduit, first to a metering means and then through a dispensing nozzle. A paddle reciprocates through an arc adjacent the dispensing nozzle and on its downward stroke is oscillated so that its lower edge abuts the dispensing nozzle to sever the dough moved through the dispensing nozzle away from the oncoming dough, and then oscillates away from the dispensing nozzle as it returns to its ready position. The downward severing movement of the paddle is initiated by the metering means.

7 Claims, 14 Drawing Figures

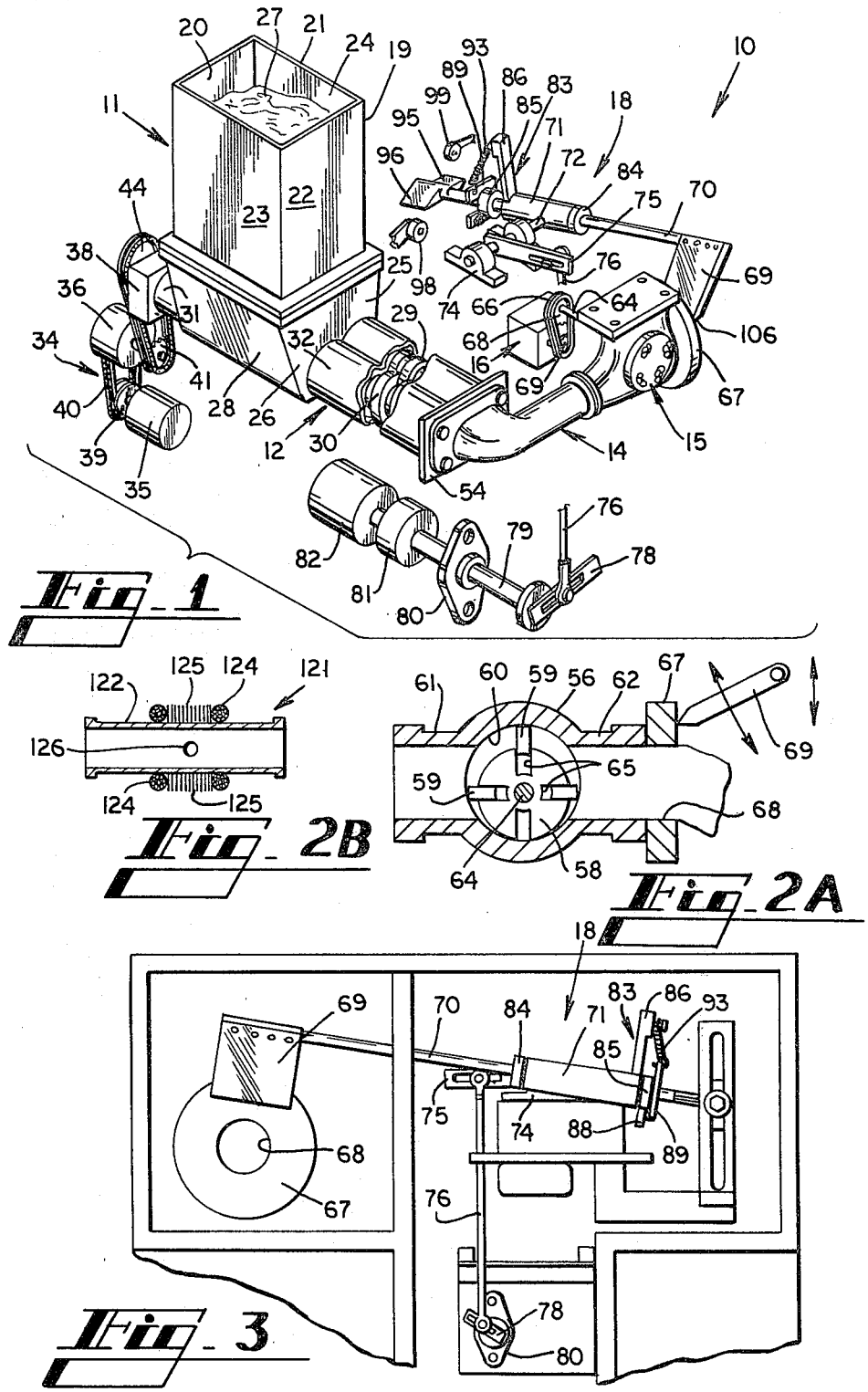

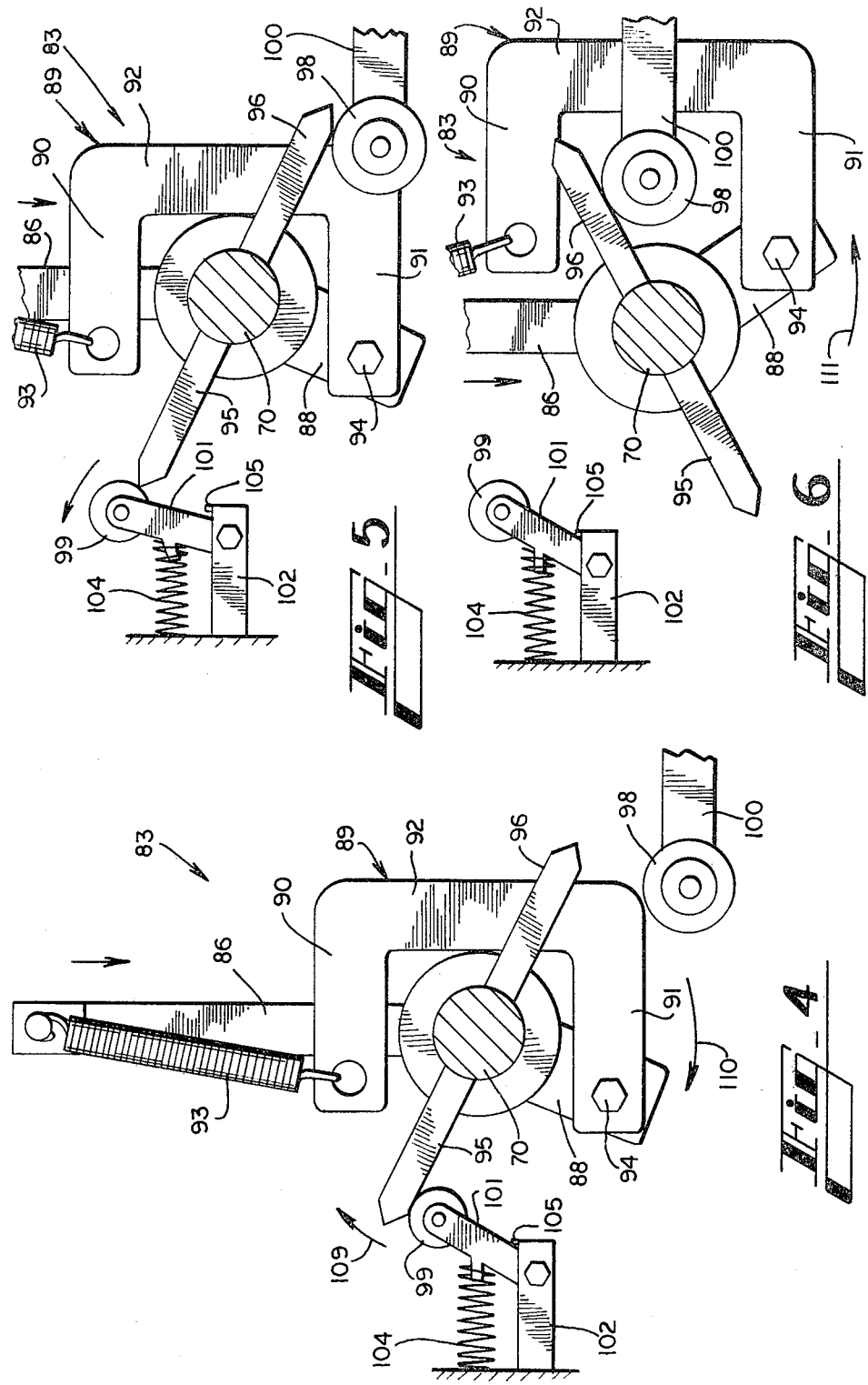

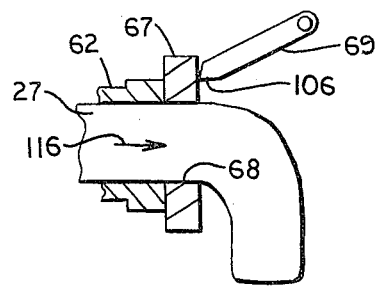
*Fig_7*
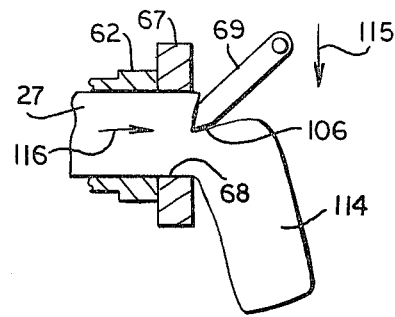
*Fig_8*
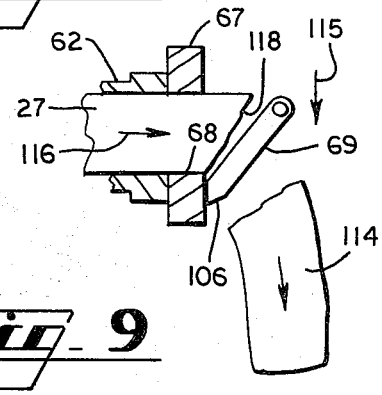
*Fig_9*
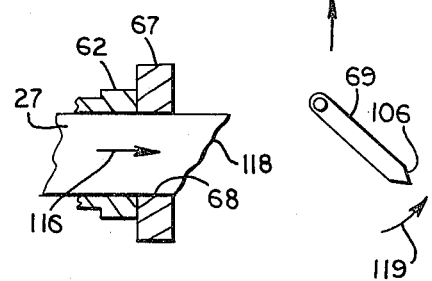
*Fig_10*
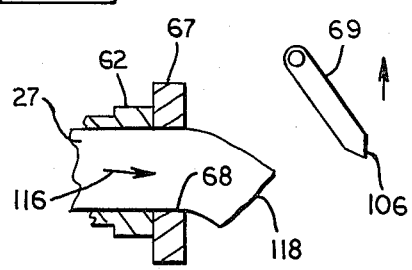
*Fig_11*
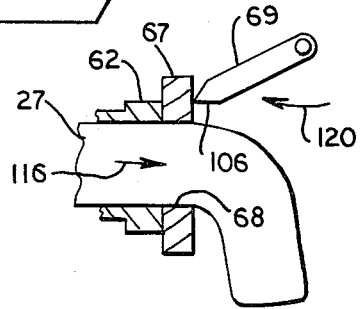
*Fig_12*
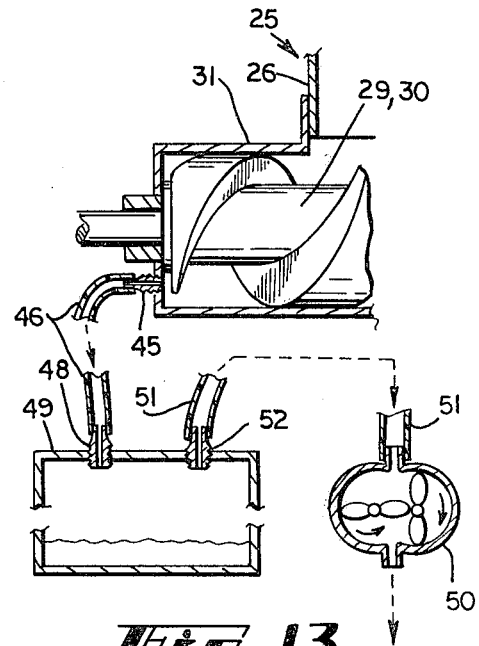
*Fig_13*

DOUGH DIVIDER

BACKGROUND OF THE INVENTION

The invention disclosed herein relates to a method and apparatus for separating a viscous flowable paste material, such as baker's dough, from a large mass of material into smaller masses of predetermined volumes appropriate for subsequent baking into bread, etc.

When flowable, viscous paste material is to be divided and dispensed from a large mass of the material into smaller measured volumes of the material, it has been common practice to urge the material from a supply of material through a conduit system to the area where it is to be subdivided and dispensed, and by repeatedly opening and closing a valve, the material moved through the conduit system can be divided from the oncoming material and dispensed to an awaiting container, conveyor, etc. When baker's dough is being divided and dispensed it is difficult to handle the dough because the dough tends to cling to the surfaces of the equipment that contact the dough, yet it is necessary to maintain the apparatus used for dividing and dispensing the dough in a clean condition during the dividing and dispensing function without permitting an accumulation of dough in or about the equipment. Also, since baker's dough tends to rise after it has been mixed and before the baking process, it is desirable to divide and dispense the dough under conditions which tend to maintain the dough in a constant density, so that when constant volumes of dough have been subdivided and dispensed, each subdivided mass of dough will be of approximately equal weight, and the subdivided masses of dough will be received in the baker's oven at substantially uniform volumes and weights for producing uniform products.

SUMMARY OF THE INVENTION

Briefly described, the present invention comprises a method and apparatus for dividing viscous flowable paste material such as baker's dough from a large mass of the material into smaller masses of predetermined volumes, under conditions wherein the dough is rapidly moved from its large mass, the moving dough is accurately metered as it moves toward a dispensing nozzle, and the dough that has passed through the dispensing nozzle is severed from the oncoming dough and falls to an awaiting container. The large mass of dough is placed in a hopper and a pair of interference fit, oppositely threaded helical screws positioned in the bottom of the hopper are rotated in opposite directions of rotation and convey the dough from the bottom of the large mass of dough in a continuous stream from the hopper into a conduit and the back pressure applied by the screw conveyor urges the dough on through the conduit, through a metering means, and from the metering means through the opening of a dispensing nozzle. A paddle reciprocates downwardly across the opening of the metering nozzle with its lower edge urged toward engagement with the nozzle, so as to sever the dough protruding from the nozzle opening from the oncoming dough, so that the severed dough mass drops from the dispensing nozzle to an awaiting container, etc. When the paddle has reached its full down position after having severed the dough, it is pivoted away from the dispensing nozzle and moved in an upward direction back to its ready position for its next severing cycle. The dough metering means can comprise any accurate metering means that does not obstruct or resist the flow of dough, but preferably comprises a metering means that accurately measures the dough and which does not accumulate dough and which is easily cleaned. For example, a rotary, sliding vane meter can be used wherein the rotary vanes are rotated by the moving stream of dough, and the rotation of the rotor of the meter is measured and the downward movement of the paddle is initiated upon the detection of a predetermined amount of rotation of the rotor, thereby causing the dough to be severed in predetermined volumes that have passed through the metering means. Also, nonintrusive flow meters can be used, such as a magnetic meter, a doppler meter and a vibration meter. The meter detects the volume of dough moved through it and initiates the cyclic movement of the paddle.

The paddle that severs the dough from the dispensing nozzle is angled downwardly toward the dispensing nozzle so that its lower edge portion sweeps across the nozzle opening to sever the dough, and upon reaching the bottom of its stroke, the lower edge portion of the paddle is pivoted away from the nozzle opening as the paddle returns to its position above the dispensing nozzle opening, so that the paddle is not contacted during its return movement by the oncoming dough moving out of the dispensing nozzle. Thus, a clean cut is made by the paddle and the dough does not have the opportunity to cling to the paddle surfaces or to the other surfaces of the dough divider apparatus.

Thus, it is an object of this invention to provide a method and apparatus for dividing a viscous flowable paste material such as baker's dough from a large mass of the material into predetermined volumes of substantially uniform weight in a continuous process.

Another object of this invention is to provide apparatus for expediently and reliably dividing baker's dough and the like from a large mass of the dough into smaller masses of predetermined volumes and weights in a continuous process, substantially without permitting the accumulation of the dough on the surfaces of the apparatus.

Another object of the invention is to provide apparatus for rapidly and accurately dispensing baker's dough and the like, which is easy to disassemble and clean, and which can be adjusted during its continuous operation to dispense smaller or larger volumes of dough.

Other objects, features and advantages of the present invention will become apparent upon reading the following specification, when taken in conjunction with accompanying drawings.

BRIEF DESCRIPTION OF THE DRAWINGS

FIG. 1 is a schematic perspective illustration of the dough divider, with the various frame and other support elements removed for clarity.

FIG. 2A is a side cross-sectional view of a rotary vane metering means.

FIG. 2B is a side cross-sectional view of a magnetic metering means.

FIG. 3 is a side view of the paddle assembly.

FIGS. 4, 5 and 6 are progressive views of the butt end of the paddle assembly, illustrating the manner in which the paddle shaft is rotated about its longitudinal axis.

FIGS. 7–12 are schematic illustrations of the paddle as it severs the dough and returns to its ready position.

FIG. 13 is a schematic illustration of a portion of the conveyor in the lower portion of the dough hopper, of the accumulation chamber, and of the vacuum pump.

DETAILED DESCRIPTION

Referring now in more detail to the drawings, in which like numerals indicate like parts throughout the several views, FIG. 1 illustrates the dough divider 10 including hopper 11, conveyor 12, conduit 14, metering means 15, counter 16 and severing assembly 18. Hopper 11 comprises upper rectangular housing 19 with sidewalls 20, 21, 22 and 23 which define an upper rectangular opening 24, and a lower converging housing 25 is positioned below upper rectangular housing 19 and also includes upright end walls 26 and converging sidewalls 28. Upper housing 19 is supported by lower housing 25 and can be removed therefrom for maintenance, cleaning, etc.

Conveyor 12 comprises a pair of oppositely threaded helical screws 29 and 30 which extend through the lower portion of lower converging housing 25, through openings (not shown) in the end walls 26 of housing 25. Helical screws 29 and 30 protrude from both ends of hopper 11 and extend into their own tubular housings 31 and 32. The helical screws 29 and 30 are arranged in parallel, side-by-side relationship in an interference fit, so that the threads of one screw fit into the gaps between the threads of the other screw. The portions of the helical screws extending through the tubular housings 31 and 32 are shaped so as to be positive displacement screws, and the portions of the screws extending along the lower portion of housing 25 are configured so as to slice the dough away from the mass of dough above the screws.

Conveyor drive means 34 comprises a motor 35, transmission 36 and gear box 38. Motor 35 is connected by means of a variable pitch sheave 39 to its V-belt 40, and V-belt 40 is extended about a variable pitch pulley (not shown) of transmission 36. Sprocket 41 of transmission 36 drives chain 42, and chain 42 drives sprocket 44 of gear box 38. Gear box 38 has two output shafts (not shown), with each shaft being connected to a helical screw 29 and 30, and with the shafts being rotatable in opposite directions of rotation with respect to each other. Thus, conveyor drive means 34 functions to rotate screws 29 and 30 in opposite directions of rotation, with their upper surfaces moving toward the opposite screw, so that the dough in hopper 11 tends to feed downwardly into the space between screws 29 and 30.

As is illustrated in FIG. 13, the tubular housing 31 at one end of hopper 11 has a small outlet opening into which is threaded outlet nozzle 45. One end of flexible conduit 46 is mounted about nozzle 45, and the other end of the conduit 46 extends about a similar nozzle 48 that communicates with an accumulation chamber 49. Vacuum pump 50 has its inlet opening connected to one end of a conduit 51 and the other end of conduit 51 is connected to a nozzle 52 which communicates with accumulation chamber 49. Pump 50 is driven by a motor (not shown) and is arranged to induce a zone of reduced pressure about screws 29 and 30, by evacuating air from the upstream end portions of the screws. The air tends to move from tubular housing 31 through conduit 46 to accumulation chamber 49, and then through conduit 51 to vacuum pump 50. Any dough or other matter that moves with the air through conduit 46 is accumulated in accumulation chamber 49. Thus, the dough in hopper 11 is induced to move downwardly in the hopper by gravity and also by the zone of low air pressure induced about a portion of the screws 29 and 30, and most of the air initially trapped in the dough in hopper 11 is removed as the dough is handled by screws 29 and 30, thus assuring that the screws will be filled with dough as they are rotated and the screws move the dough with substantially no pockets of air trapped in the dough out of the lower end of hopper 11. The movement of air from hopper 11 into housing 31 tends to pull dough into the housing 31; however, the end portions of the screws extending into housing 31 are positive displacement screws and the dough induced by the air on into the housing 31 is moved by the screws in the opposite direction along the bottom of the hopper to the outlet housing 32, where the screws positively move the dough on through the system.

As illustrated in FIG. 1, when the dough moves to the end of tubular housing 32, it reaches the end plate 54 of conveyor 12, and the L-shaped conduit 14 is mounted to end plate 54 and receives the dough through the openings (not shown) of end plate 54 and turns the dough through a gradual 90 degree turn and directs it under pressure through metering means 15.

As illustrated in FIG. 2A, metering means 15 can comprise a rotary, sliding vane meter 55 that includes a housing 56, a rotor 58, and sliding vanes 59. Housing 56 defines cylindrical chamber 60 and conduit sections 61 and 62 that intersect cylindrical chamber 60. Rotor 58 is rotatably mounted on axle 64 which extends through the central portion of rotor 58, and axle 64 is off-set from the longitudinal centerline of cylindrical chamber 60 of housing 56. Vanes 59 are each mounted in slots 65 which extend radially outwardly from the center of rotor 58 and which are spaced at 90 degree intervals about the circumference of rotor 58. Each vane 59 is a sliding vane in that it reciprocates of slides inwardly and outwardly of its slot 65 so as to engage the circular surface of cylindrical chamber 60 as rotor 58 rotates. Thus, when dough is urged through L-shaped conduit 14 into metering means 15, the dough tends to engage the vane 59 that is extended from rotor 58 and push against the vane so that the vane slides about the cylindrical chamber 60, which permits the dough to move over the rotor 58 from the inlet conduit section 61 to the outlet conduit section 62. In the meantime, the other vanes 59 are retracted in their slots 65. Thus, the rotor 58 rotates through a given arc for each predetermined quantity of dough urged through metering means 15, so that measuring the rotary movement of the rotor gives an accurate indication of the amount of dough moved through the metering means.

As illustrated in FIG. 1, counter 16 is connected to axle 64 of metering means 15 by means of timing belt 66 extending around toothed sprocket 68 on the end of axle 64 and about toothed sprocket 69 of the input shaft of counter 16. In the particular embodiment disclosed herein, counter 16 is arranged to emit pulses in response to rotary movement of rotor 58, and the pulses are accumulated until a predetermined number of pulses are reached, whereupon an output signal is emitted that causes severing assembly 18 to begin its operation. Thus, a predetermined quantity of dough is moved through metering means 15 before counter 16 emits its output signal to actuate severing assembly 18.

As illustrated in FIGS. 1 and 3, severing assembly 18 comprises a paddle 69 mounted on one end of paddle shaft 70, oscillating socket 71 which receives paddle shaft 70 intermediate its ends, drive shaft 72 mounted at a right angle with respect to oscillating socket 71 and supported by bearings 74, crank shaft 75 connected to drive shaft 72, push rod 76 connected to crank shaft 75, crank arm 78 rotatably connected to the lower end of push rod 76, and drive shaft 79 connected to crank arm 78 and extending through bearing 80. Wrap spring clutch 81 and motor 82 releasably engage drive shaft 79. When clutch 81 is engaged, motor 82 rotates crank arm 78, thus causing push rod 76 to be oscillated along its length, causing crank shaft 75 to move oscillating socket 71 and paddle shaft 70 in an arcuate movement so that paddle 69 moves up and down in an approximately vertical arc across the outlet opening 68 of dispensing nozzle 67.

As illustrated in FIGS. 1-6, over center spring mechanism 83 is mounted on the butt end of paddle shaft 70. Paddle shaft 70 is loosely held by oscillating socket 71, and lock collars 84 and 85 are rigidly connected to paddle shaft 70 by set screws so that the paddle shaft cannot move longitudinally with respect to socket 71 but the paddle shaft can rotate about its longitudinal axis in socket 71. Spring support 86 is rigidly mounted to socket 71 and extends upwardly therefrom. Oscillating arm 88 projects downwardly from lock collar 85 and moves with lock collar 85 in response to the movement of paddle shaft 70. As best illustrated in FIGS. 4-6, U-shaped connector arm 89 comprises upper and lower laterally extending legs 90-91 and intermediate leg 92. Lower leg 91 is pivotally connected to oscillating arm 88 by pivot pin 94. Coil tension spring 93 is connected at its upper end to spring support 86 and at its lower end to the protruding end of upper laterally extending leg 90 of U-shaped connector arm 89.

Cam protrusions 95 and 96 are rigidly mounted to opposite sides of paddle shaft 70, and cam rollers 98 and 99 are located adjacent cam protrusions 95 and 96. Cam roller 98 is mounted in a stationary position by its support 100, while cam roller 99 is retractable in that it is mounted on the upper end of lever 101, and the lower end of lever 101 is pivotally mounted to support 102. Coil compression spring 104 biases lever 101 outwardly against stop 105 so that cam roller 99 stays in the position illustrated in FIGS. 4 and 6 unless its spring 104 is contracted.

When paddle 69 and its paddle shaft 70 are oscillated so that paddle 69 moves through an arcuate path adjacent the outlet opening 68 of dispensing nozzle 67, the butt end of paddle shaft 70, the end remote from paddle 69, moves downwardly as paddle 69 moves upwardly and moves upwardly when paddle 69 moves downwardly. When paddle 69 is in its up position, the over center mechanism 83 is in the position illustrated in FIG. 6, where cam protrusion 96 engages cam roller 98 and oscillating arm 88 is moved to the right of the longitudinal centerline of paddle shaft 70. Thus, coil tension spring 93 biases paddle shaft 70 in the direction indicated by arrow 111, causing the lower edge portion 106 of paddle 69 to be urged against the face of dispensing nozzle 67. Thus, the cutting edge of paddle 69 sweeps downwardly across the outlet opening 68 of dispensing nozzle 67 as the paddle 69 moves downwardly.

When paddle 69 approaches the bottom of its downward stroke, the over center mechanism 83 at the butt end of paddle shaft 70 approaches the top of its upward stroke and protrusion 95 urges movable cam roller 99 out of the way, and when the over center mechanism reaches the top of its stroke the protrusion 95 clears movable cam roller 99 and spring 104 moves the cam roller back to its normal position. When paddle 69 begins its upward movement, cam protrusion begins its downward movement and engages movable cam roller 99 again, but cam roller 99 does not move out of the way until it causes paddle shaft 70 to twist in socket 71 in the direction as indicated by arrow 109 (FIG. 4). This causes the paddle shaft 70 to be twisted about its longitudinal axis, and causes the lower edge portion 106 of paddle 69 to be moved away from dispensing nozzle 67. In the meantime, the oscillating arm 88 of lock collar 85 moves in unison with paddle shaft 70 from the right side to the left side of this longitudinal centerline of paddle shaft 70, as indicated by arrow 110 (FIG. 4). This causes U-shaped connector arm 89 to move to the left, so that the pivot pin 94 is now to the left of the longitudinal centerline of paddle shaft 70 and the force applied by spring 93 biases paddle shaft 70 and paddle 79 clockwise about the longitudinal centerline of paddle shaft 70, in the direction as indicated by arrow 109. As the butt end of paddle shaft 70 continues its downward movement, the angle formed between cam protrusion 95 and movable cam roller 99 permits the cam roller 99 to move out of the way of cam protrusion 95, and eventually the other cam protrusion 96 engages its stationary cam roller 98 (FIG. 5), thus oscillating paddle shaft 70 and paddle 69 in the direction indicated by arrow 111 (FIG. 6), which places the lower edge portion 106 of paddle 69 back into engagement with dispensing nozzle 67. Over center mechanism 87 is also moved to the position illustrated in FIG. 6 so that it again biases the lower edge portion into engagement with dispensing nozzle 67.

As progressively illustrated in FIGS. 7-12, the lower edge portion 106 of paddle 69 is biased into engagement with dispensing nozzle 67 above the outlet opening 68 when the severing assembly is in its ready position. When the movement of paddle shaft 70 is initiated so that paddle 69 is moved in a downward direction (FIG. 8), the lower edge portion 106 of paddle 69 sweeps across outlet opening 68 and severs the portion of the dough extending from the mass of dough 27. The severed portion 114 is progressively severed by the downward movement of paddle 69 as indicated by arrow 115, and the mass of dough 27 continues its movement through dispensing nozzle 67 as indicated by arrow 116. Thus, a wedge shaped end 118 is progressively formed by the combined movements of the paddle 69 and the oncoming dough 27, but the angle of paddle 69 is greater than the angle of the wedge shaped end 118, so that the upper surface of the paddle 69 clears the oncoming wedge shaped end 118 of the dough 27. In the meantime, gravity tends to pull the smaller divided mass 114 of dough that has been severed by paddle 69 downwardly away from the paddle, so that there is substantially no residue of dough remaining on the surfaces of paddle 69.

As illustrated in FIG. 10, when paddle 69 begins its upward movement toward its return position, it is pivoted away from nozzle 67 so that it does not contact the oncoming dough 27, as indicated by arrow 119. When the paddle 69 approaches the end of its upward movement, it is located above the outlet opening 68 of dispensing nozzle 67 (FIG. 11), and then is oscillated back to its ready position (FIG. 12) as indicated by arrow 120.

As illustrated in FIG. 2B, a nonintrusive flow meter 121 can be substituted for the rotary vane flow meter of FIG. 2A. The particular nonintrusive flow meter of FIG. 2A is a magnetic flow meter which includes a nonconductive conduit section 122 and magnet coils 124 surrounding conductive cores or armatures 125 on opposite sides of the conduit so as to induce a magnetic field across the conduit. As the dough is moved through the conduit at a right angle across the magnetic field, the dough induces a voltage which is proportional to the velocity of the dough. Electrodes 126 are positioned on opposite sides of the conduit, and the voltage conducted by the electrodes is proportional to the volume of dough moved through the conduit. The more rapid the rate of flow of dough through the conduit 122, the greater the instantaneous value of signal voltage monitored by the electrodes 126. This function can be express mathematically as:

$$E_s = (1/a)BDV$$

where:
$E_s$ = induced electrode voltage
B = magnetic field strength
D = conduit diameter
V = velocity of dough
$a$ = constant The voltage from electrodes 126 is divided into pulses, preferably 100 pulses per ounce of dough, and the pulses are counted by counter 16. An example of a commercial magnetic metering means is the Magnetic Flowmeter, Model 10D1419A/U, manufactured by Fischer & Porter Co., Warminster, Pa. 18974, U.S.A. An example of a commercial flow converter for detecting and dividing the voltage from the flow meter into pulses is the Flow Converter, Model 50PZ1000B, also manufactured by Fischer & Porter Co.

While this invention has been described in specific detail with particular reference to a preferred embodiment thereof, it will be understood that variations and modifications can be affected within the spirit and scope of the invention as described hereinbefore and as defined in the appended claims.

What is claimed is:

1. Apparatus for separating a viscous flowable paste material such as dough from a large mass of the material into smaller masses of predetermined volume comprising a material hopper, a metering means, a dispensing nozzle, conveyor means communicating at the bottom of said hopper with the material in said hopper for moving the material through said metering means and said dispensing nozzle, said metering means comprising means for measuring the volume of material moved through said metering means, and severing means responsive to said metering means for severing the material moved through said dispensing nozzle from the oncoming material, said severing means comprising a paddle shaft rotatable about its longitudinal axis, a paddle mounted on one end portion of said paddle shaft, means for pivoting said paddle shaft about an axis intermediate the ends of said paddle shaft with the paddle reciprocatable in a vertically extending arc adjacent said dispensing nozzle, and means for rotating said paddle shaft about its longitudinal axis to oscillate the lower edge portion of said paddle into juxtaposition with said dispensing nozzle as the paddle moves downwardly across the nozzle and to oscillate the lower edge portion of said paddle away from said dispensing nozzle as the paddle moves upwardly across the nozzle.

2. The apparatus of claim 1 and further including spring means for urging the lower edge portion of said paddle into engagement with said nozzle as said paddle moves downwardly across the nozzle and for holding the lower edge portion of said paddle away from said nozzle as said paddle moves upwardly across the nozzle.

3. Apparatus for separating a viscous flowable paste material such as dough from a large mass of the material into smaller masses of predetermined volumes comprising a material hopper, a metering means, a dispensing nozzle, conveyor means communicating at the bottom of said hopper with the material in said hopper for moving the material through said metering means and said dispensing nozzle, said metering means comprising means for measuring the volume of material moved through said metering means, and severing means responsive to said metering means for severing the material moved through said dispensing nozzle from the oncoming material, said severing means comprising a paddle, means for oscillating said paddle in up and down directions adjacent said dispensing nozzle, spring means for biasing a lower edge portion of said paddle into engagement with said dispensing nozzle as said paddle moves in a downward direction across said dispensing nozzle to remove the material protruding from said dispensing nozzle and for biasing the lower edge portion of the paddle away from said dispensing nozzle as said paddle moves in an upward direction across said dispensing nozzle to displace the edge portion of said paddle out of the way of the oncoming dough from the nozzle.

4. The apparatus of claim 3 and wherein said conveyor means comprises a pair of oppositely threaded interference fit helical screw elements positioned in the lower portion of and extending through an opening in the lower side portion of said hopper, and means for rotating said screw elements in opposite directions of rotation to convey the material from the bottom portion of said hopper through the opening in the lower side portion of said hopper to said metering means and said nozzle.

5. The apparatus of claim 3 and wherein said metering means comprises a rotary sliding vane meter with a stator defining an approximately cylindrical rotor chamber, a rotor in said chamber and rotatable about an axis off center with respect to said chamber, and a plurality of vanes extending radially outwardly from said rotor and radially slidable with respect to said rotor and circumferentially slidable with respect to said chamber.

6. The apparatus of claim 3 and wherein said metering means comprises a nonconductive conduit, armatures positioned on opposite sides of said conduit for inducing a magnetic field across the path of the dough moving through the conduit, and electrodes positioned in the conduit for detecting the voltage induced by the movement of the dough through the magnetic field.

7. The apparatus of claim 3 and further including means for forming a zone of reduced pressure about a portion of said conveyor means in said hopper to induce the material in said hopper to move toward said conveyor means.

* * * * *